United States Patent

Harris

(10) Patent No.: US 10,856,529 B2
(45) Date of Patent: Dec. 8, 2020

(54) PROTECTIVE GARMENT FOR A NURSING ANIMAL

(71) Applicant: Michelle Harris, Granite Bay, CA (US)

(72) Inventor: Michelle Harris, Granite Bay, CA (US)

( * ) Notice: Subject to any disclaimer, the term of this patent is extended or adjusted under 35 U.S.C. 154(b) by 390 days.

(21) Appl. No.: 15/459,153

(22) Filed: Mar. 15, 2017

(65) Prior Publication Data

US 2018/0263217 A1    Sep. 20, 2018

(51) Int. Cl.
*A01K 13/00* (2006.01)
*A01K 19/00* (2006.01)
*A44B 18/00* (2006.01)

(52) U.S. Cl.
CPC ............ *A01K 19/00* (2013.01); *A01K 13/006* (2013.01); *A44B 18/0069* (2013.01)

(58) Field of Classification Search
CPC .................................................. A01K 13/006
USPC ................................................. 119/850, 852
See application file for complete search history.

(56) References Cited

U.S. PATENT DOCUMENTS

| | | | | |
|---|---|---|---|---|
| 2,331,601 A | * | 10/1943 | Doughty | A61D 9/00 |
| | | | | 119/852 |
| 2,417,803 A | * | 3/1947 | De Mar | A01K 13/006 |
| | | | | 119/850 |
| 3,141,443 A | | 7/1964 | Huey | |
| 4,355,600 A | | 10/1982 | Zielinski | |
| 5,188,061 A | | 2/1993 | Lombardi | |
| 6,058,890 A | * | 5/2000 | Harrell | A01K 13/006 |
| | | | | 119/850 |
| 7,044,087 B1 | | 5/2006 | Brecheen | |
| D664,720 S | | 7/2012 | Leonard | |
| 8,733,296 B1 | * | 5/2014 | Douglas | A01K 13/006 |
| | | | | 119/850 |
| 8,985,062 B1 | * | 3/2015 | Syberg | A61D 9/00 |
| | | | | 119/850 |
| 2009/0173290 A1 | | 7/2009 | Freitag | |
| 2009/0205574 A1 | | 8/2009 | Ross | |
| 2013/0055958 A1 | | 3/2013 | McKenzie | |

* cited by examiner

*Primary Examiner* — David J Parsley

(57) ABSTRACT

A protective garment for selectively shielding the nipples of a nursing animal includes a sleeve that has opposing ends. The opposing ends are open, such that the sleeve is configured to position around a torso of the nursing animal with at least the nipples of the nursing animal covered by the sleeve. A plurality of holes is positioned through a bottom of the sleeve. Each hole is configured to insert a respective nipple of the nursing animal. A guard is configured to reversibly couple to the bottom of the sleeve. The guard is positioned to couple to the sleeve to cover the plurality of holes, such that the nipples positioned through the holes are shielded.

1 Claim, 4 Drawing Sheets

US 10,856,529 B2

PROTECTIVE GARMENT FOR A NURSING ANIMAL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to protective garments and more particularly pertains to a new protective garment for selectively shielding the nipples of a nursing animal.

BRIEF SUMMARY OF THE INVENTION

An embodiment of the disclosure meets the needs presented above by generally comprising a sleeve that has opposing ends. The opposing ends are open, such that the sleeve is configured to position around a torso of the nursing animal with at least the nipples of the nursing animal covered by the sleeve. A plurality of holes is positioned through a bottom of the sleeve. Each hole is configured to insert a respective nipple of the nursing animal. A guard is configured to reversibly couple to the bottom of the sleeve. The guard is positioned to couple to the sleeve to cover the plurality of holes, such that the nipples positioned through the holes are shielded.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
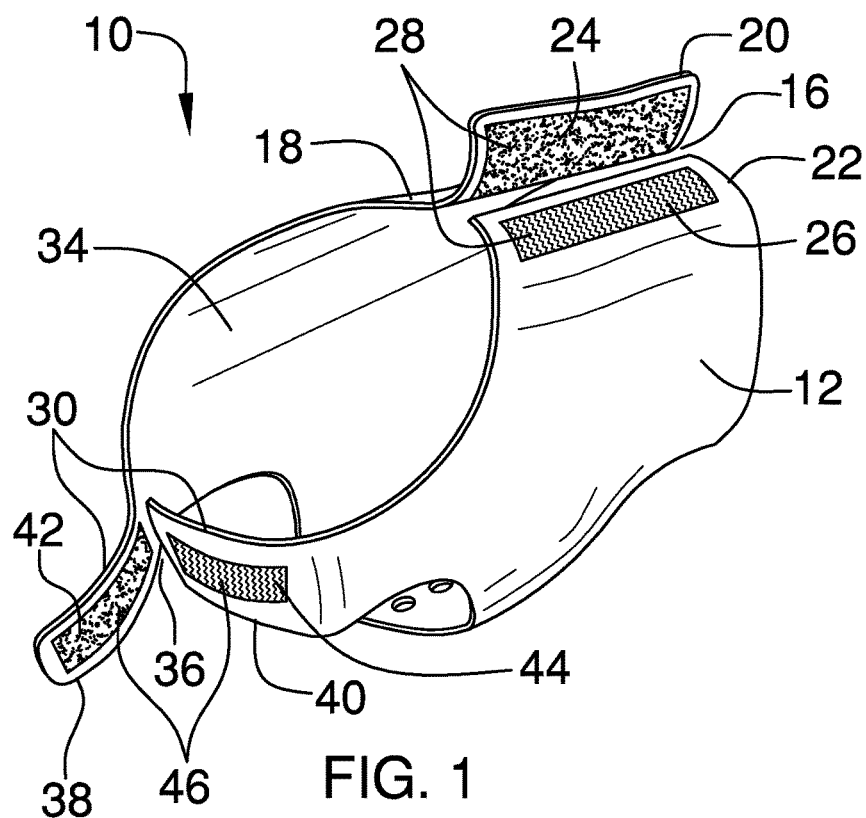
FIG. 1 is an isometric perspective view of a protective garment for a nursing animal according to an embodiment of the disclosure.
Figure 2:
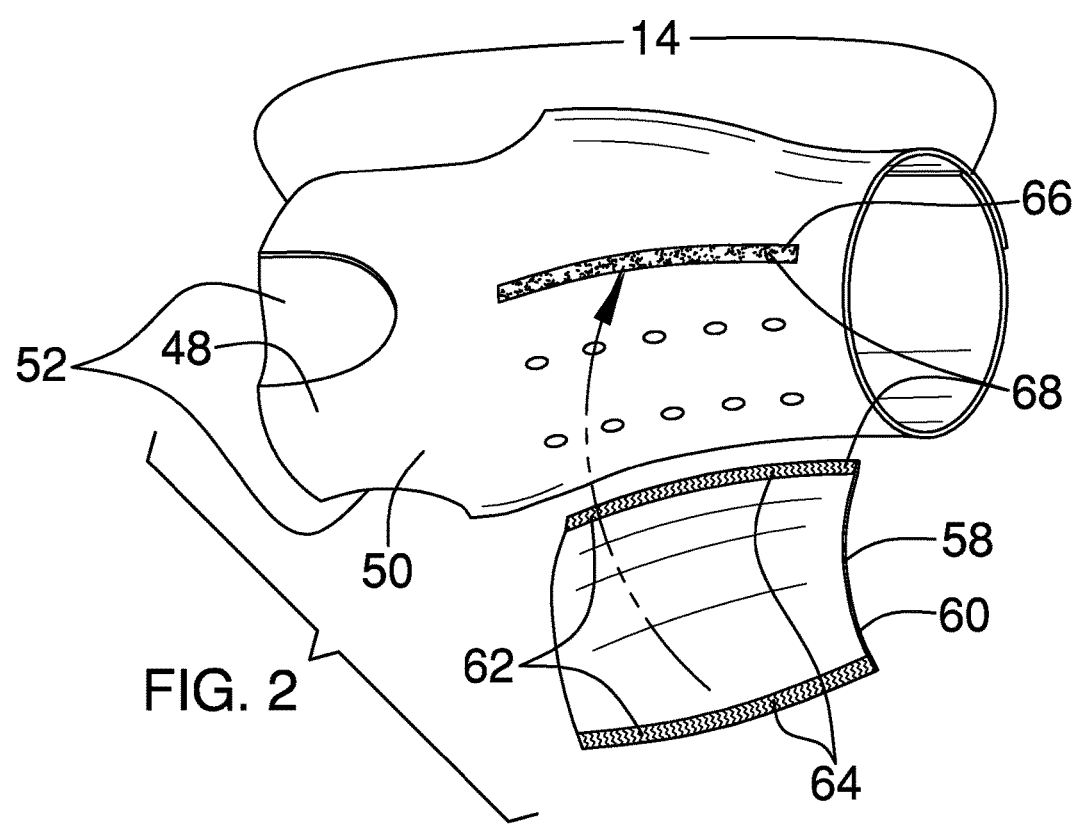
FIG. 2 is an isometric perspective view of an embodiment of the disclosure.
Figure 3:
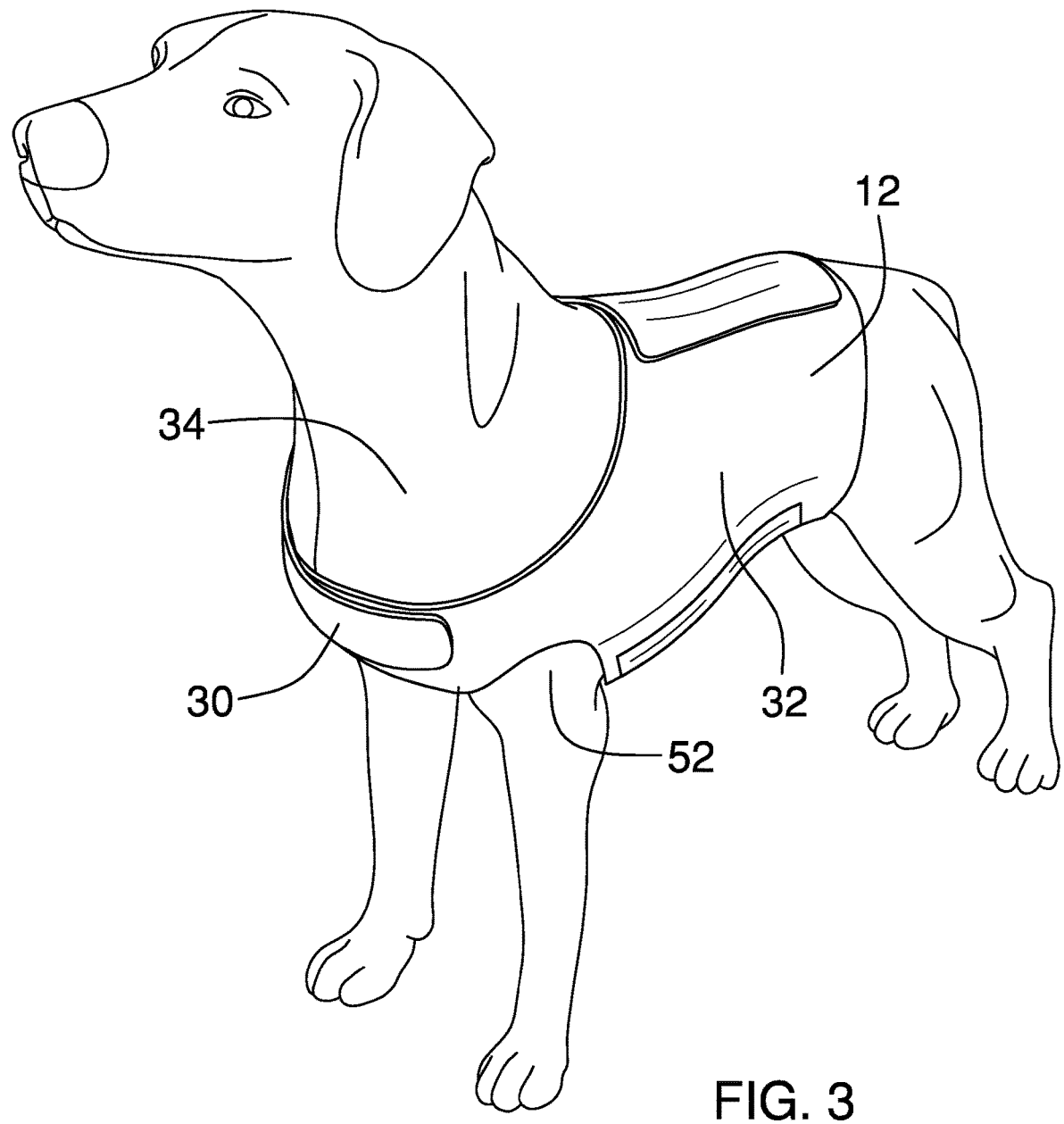
FIG. 3 is an in-use view of an embodiment of the disclosure.
Figure 4:
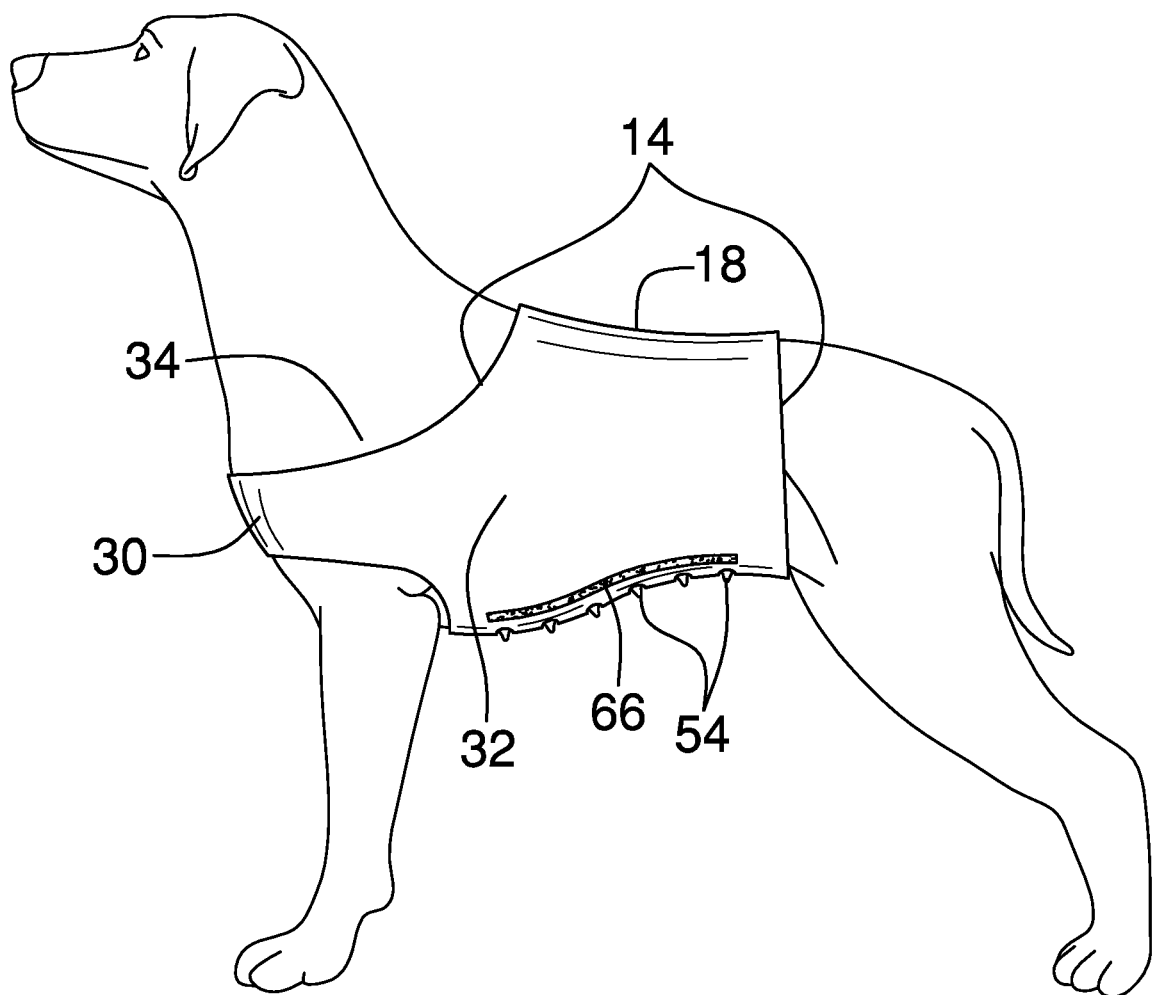
FIG. 4 is an in-use view of an embodiment of the disclosure.
Figure 5:
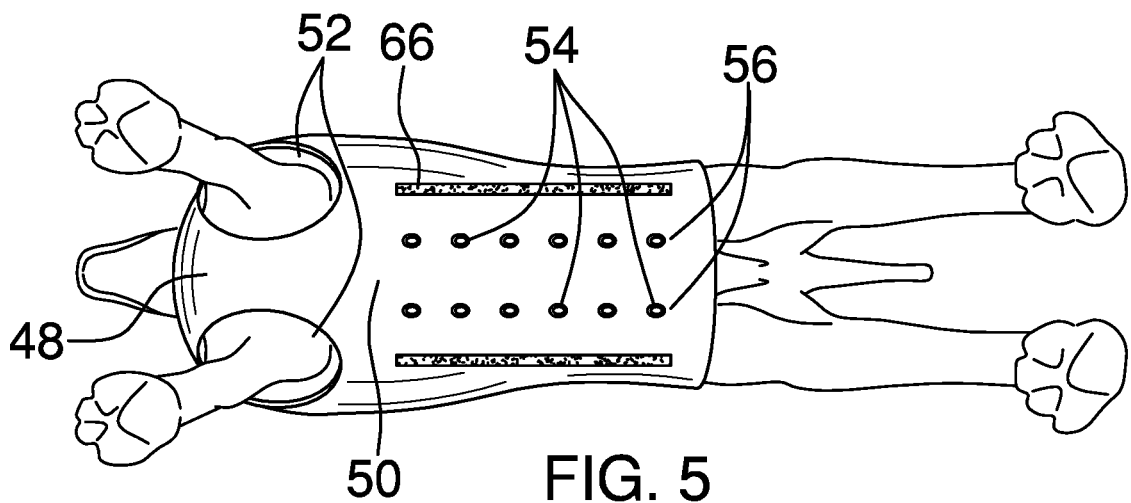
FIG. 5 is an in-use view of an embodiment of the disclosure.
Figure 6:
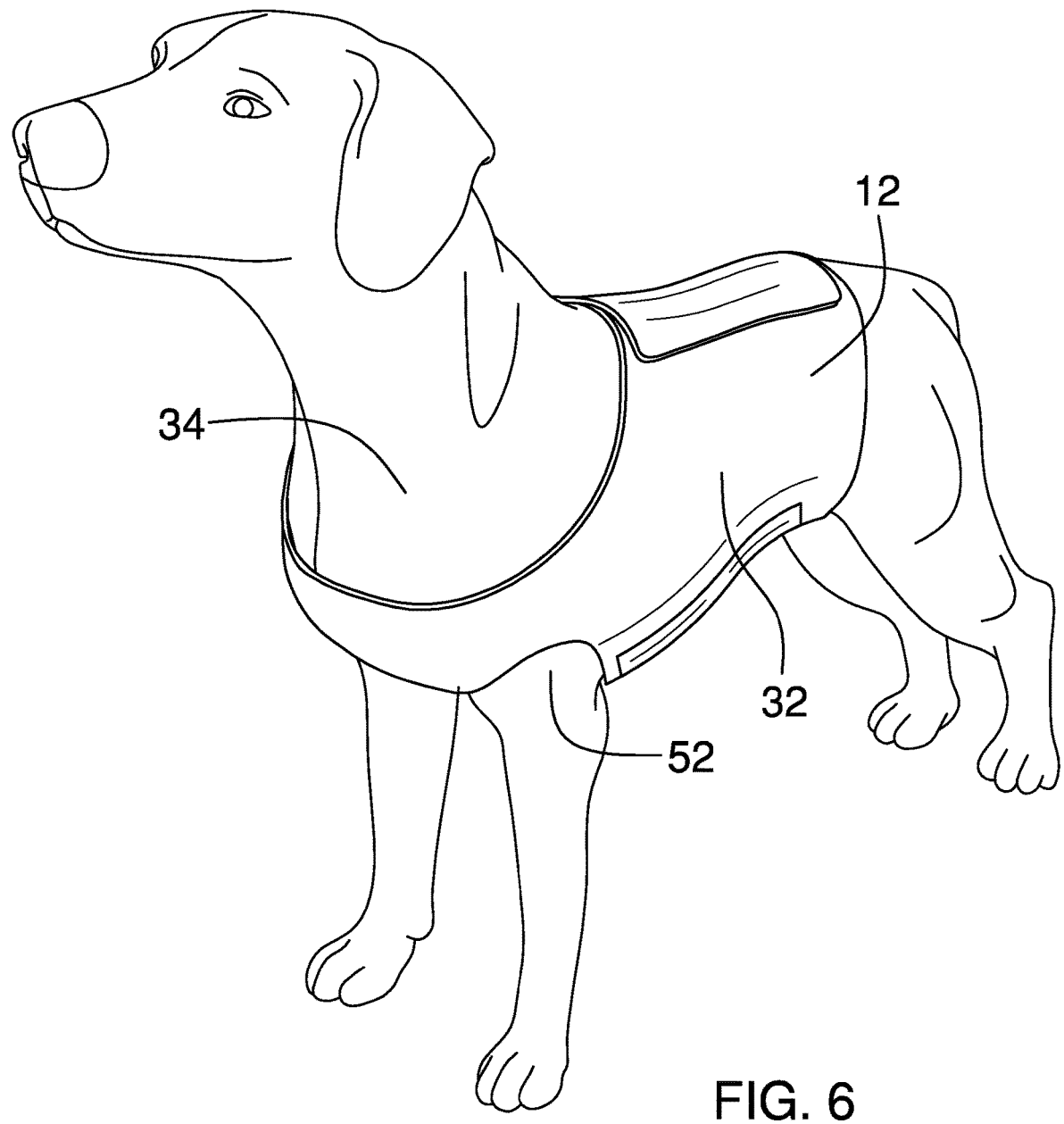
FIG. 6 is a top front side in-use perspective view of an embodiment of the disclosure.

With reference now to the drawings, and in particular to FIGS. 1 through 6 thereof, a new protective garment embodying the principles and concepts of an embodiment of the disclosure and generally designated by the reference numeral 10 will be described.

As best illustrated in FIGS. 1 through 6, the protective garment for a nursing animal 10 generally comprises a sleeve 12 that has opposing ends 14. The opposing ends 14 are open. The opposing ends 14 are positioned on the sleeve 12 such that the sleeve 12 is configured to position around a torso of a nursing animal with at least the nipples of the nursing animal covered by the sleeve 12. The sleeve 12 is resilient. In one embodiment, the sleeve 12 comprises polychloroprene. In another embodiment, the sleeve 12 comprises polyester-polyurethane copolymer.

A first slit 16 is positioned longitudinally through a top 18 of the sleeve 12 and defines a first flap 20 and a second flap 22. A first fastener 24 is coupled to the first flap 20 proximate to the first slit 16. A second fastener 26 is coupled to the second flap 22 proximate to the first slit 16. The second fastener 26 is complementary to the first fastener 24. The second fastener 26 is positioned on the second flap 22 such that the second fastener 26 is positioned to couple to the first fastener 24 to couple the second flap 22 to the first flap 20 and to position the sleeve 12 around the torso of the nursing animal. In one embodiment, the first fastener 24 and the second fastener 26 comprise a first nylon hook and loop fastener 28.

In one embodiment, a strap 30 is coupled to and extends between opposing sides 32 of the sleeve 12 and adjacent to a respective opposing end 14 of the sleeve 12 and defines a head opening 34 of the sleeve 12. The strap 30 is resilient. In another embodiment, the strap 30 comprises polychloroprene. In yet another embodiment, the strap 30 comprises polyester-polyurethane copolymer.

In one embodiment, a second slit 36 is positioned vertically through the strap 30 substantially equally distant from the opposing sides 32 of the sleeve 12 and defines a first strip 38 and a second strip 40. A first coupler 42 is coupled to the first strip 38 proximate to the second slit 36. A second coupler 44 is coupled to the second strip 40 proximate to the second slit 36. The second coupler 44 is complementary to the first coupler 42. The second coupler 44 is positioned on second strip 40 such that the second coupler 44 is positioned to couple to the first coupler 42 to couple the second strip 40 to the first strip 38. The strap 30 is positioned around a chest of the nursing animal. In another embodiment, the first coupler 42 and the second coupler 44 comprise a second nylon hook and loop fastener 46.

In one embodiment, an extension 48 is coupled to and extends between a bottom 50 of the sleeve 12 and the strap 30 and defines a pair of leg openings 52. The extension 48 is positioned on the sleeve 12 and the strap 30 such that the leg openings 52 are configured for insertion of the front legs of the nursing animal as the sleeve 12 is positioned around the torso of the nursing animal. The extension 48 is resilient. In another embodiment, the extension 48 comprises polychloroprene. In yet another embodiment, the extension 48 comprises polyester-polyurethane copolymer.

A plurality of holes 54 is positioned through the bottom 50 of the sleeve 12. The holes 54 are positioned through the sleeve 12 such that each hole 54 is configured to insert a respective nipple of the nursing animal. In one embodiment, the plurality of holes 54 comprises from four to sixteen holes 54. In another embodiment, the plurality of holes 54 comprises from eight to twelve holes 54. In yet another embodiment, the plurality of holes 54 comprises ten holes 54.

In one embodiment, the plurality of holes 54 is positioned in a plurality of rows 56. The rows 56 are substantially evenly spaced on the bottom 50 and are substantially parallel. In another embodiment, the plurality of rows 56 comprises four rows 56 that extend longitudinally substantially between the opposing ends 14 of the sleeve 12.

A guard 58 is configured to reversibly couple to the bottom 50 of the sleeve 12. The guard 58 is positioned to couple to the sleeve 12. The guard 58 is resilient. The guard 58 is positioned to cover the plurality of holes 54 such that the nipples that are positioned through the holes 54 are shielded. In one embodiment, the guard 58 comprises polychloroprene. In another embodiment, the guard 58 comprises polyester-polyurethane copolymer.

The guard 58 comprises a panel 60 that is substantially rectangularly shaped. Each of a pair of first connectors 62 is coupled singly proximate to opposing edges 64 of the panel 60. Each of a pair of second connectors 66 is coupled to the bottom 50 of the sleeve 12 proximate to the plurality of holes 54. The second connectors 66 are positioned on the sleeve 12 such that the second connectors 66 are positioned to couple to the first connectors 62 to couple the panel 60 to the sleeve 12 with the panel 60 positioned to cover the plurality of holes 54. The second connectors 66 also are positioned such that a respective second connector 66 is positioned to couple with a respective first connector 62 such that the panel 60 is coupled to the sleeve 12 but does not cover the holes 54. In one embodiment, each first connector 62 and a respective second connector 66 comprise a third nylon hook and loop fastener 68.

In use, the opposing ends 14 are positioned on the sleeve 12 such that the sleeve 12 is configured to position around a torso of a nursing animal with at least the nipples of the nursing animal covered by the sleeve 12. The holes 54 are positioned through the sleeve 12 such that each hole 54 is configured to insert a respective nipple of the nursing animal. The guard 58 is positioned to couple to the sleeve 12. The guard 58 is positioned to cover the plurality of holes 54 such that the nipples that are positioned through the holes 54 are shielded.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A protective garment for a nursing animal comprising:

a sleeve having opposing ends, said opposing ends being open, wherein said opposing ends are positioned on said sleeve such that said sleeve is configured for positioning around a torso of a nursing animal, said sleeve being resilient, said sleeve comprising polychloroprene, said sleeve comprising polyester-polyurethane copolymer;

a first slit positioned longitudinally through a top of said sleeve defining a first flap and a second flap;

a first fastener coupled to said first flap proximate to said first slit;

a second fastener coupled to said second flap proximate to said first slit, said second fastener being complementary to said first fastener, wherein said second fastener is positioned on said second flap such that said second fastener is positioned to couple to said first fastener, such that said second flap is coupled to said first flap, wherein said sleeve is positioned around the torso of the nursing animal, said first fastener and said second fastener comprising a first nylon hook and loop fastener;

a strap coupled to and extending between opposing sides adjacent to a respective said opposing end of said sleeve defining a head opening of said sleeve, said strap being resilient, said strap comprising polychloroprene, said strap comprising polyester-polyurethane copolymer;

a second slit positioned vertically through said strap substantially equally distant from said opposing sides of said sleeve defining a first strip and a second strip;

a first coupler coupled to said first strip proximate to said second slit;

a second coupler coupled to said second strip proximate to said second slit, said second coupler being complementary to said first coupler, wherein said second coupler is positioned on said second strip such that said second coupler is positioned to couple to said first coupler, such that said second strip is coupled to said first strip, wherein said strap is positioned around a chest of the nursing animal, said first coupler and said second coupler comprising a second nylon hook and loop fastener;

an extension coupled to and extending between a bottom of said sleeve and said strap defining a pair of leg openings, wherein said extension is positioned on said sleeve and said strap such that said leg openings are configured for insertion of the front legs of the nursing animal as said sleeve is positioned around the torso of the nursing animal, said extension being resilient, said extension comprising polychloroprene, said extension comprising polyester-polyurethane copolymer;

a plurality of holes positioned through said bottom of said sleeve, wherein said holes are positioned through said sleeve such that each said hole is configured for insertion of a respective nipple of the nursing animal, said plurality of holes comprising from four to sixteen said holes, said plurality of holes comprising from eight to twelve said holes, said plurality of holes comprising ten said holes, said plurality of holes being positioned in a plurality of rows, said rows being substantially evenly spaced on said bottom, said rows being substantially parallel, said plurality of rows comprising four said rows extending longitudinally substantially between said opposing ends of said sleeve;

a guard configured to reversibly couple to said bottom of said sleeve, wherein said guard is positioned to couple to said sleeve such that said guard is positioned to cover said plurality of holes such that the nipples positioned through said holes are shielded, said guard being resilient, said guard comprising polychloroprene, said guard comprising polyester-polyurethane copolymer, said guard comprising:

- a panel, said panel being substantially rectangularly shaped,
- a pair of first connectors coupled singly proximate to opposing edges of said panel,
- a pair of second connectors coupled to said bottom of said sleeve proximate to said plurality of holes, and
- wherein said second connectors are positioned on said sleeve such that said second connectors are positioned to couple to said first connectors to couple said panel to said sleeve such that said panel is positioned to cover said plurality of holes, each said first connector and a respective said second connector comprising a third nylon hook and loop fastener; and wherein said opposing ends are positioned on said sleeve such that said sleeve is configured for positioning around a torso of a nursing animal such that at least the nipples of the nursing animal are covered by said sleeve, wherein said holes are positioned through said sleeve such that each said hole is configured for insertion of a respective nipple of the nursing animal, wherein said guard is positioned to couple to said sleeve such that said guard is positioned to cover said plurality of holes such that the nipples positioned through said holes are shielded.

\* \* \* \* \*